United States Patent
Kumar et al.

(10) Patent No.: US 11,290,524 B2
(45) Date of Patent: Mar. 29, 2022

(54) SCALABLE FAULT RESILIENT COMMUNICATIONS WITHIN DISTRIBUTED CLUSTERS

(71) Applicant: Microsoft Technology Licensing, LLC, Redmond, WA (US)

(72) Inventors: Abhinit Kumar, Bellevue, WA (US); Andrea D'Amato, Kirkland, WA (US); David Allen Dion, Bothell, WA (US); Gor Nishanov, Redmond, WA (US); Lokesh Srinivas Koppolu, Redmond, WA (US); Nicholas Maliwacki, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 646 days.

(21) Appl. No.: 14/459,072

(22) Filed: Aug. 13, 2014

(65) Prior Publication Data
US 2016/0050262 A1 Feb. 18, 2016

(51) Int. Cl.
*G06F 15/173* (2006.01)
*G06F 15/16* (2006.01)
(Continued)

(52) U.S. Cl.
CPC .......... *H04L 67/10* (2013.01); *G06F 9/4856* (2013.01); *G06F 9/5083* (2013.01);
(Continued)

(58) Field of Classification Search
CPC ............... H04L 29/08072; H04L 29/06; H04L 29/08135; H04L 29/08648;
(Continued)

(56) References Cited

U.S. PATENT DOCUMENTS

| | | |
|---|---|---|
| 5,533,039 A | 7/1996 | Boyer |
| 7,480,256 B2 | 1/2009 | Akyol et al. |

(Continued)

FOREIGN PATENT DOCUMENTS

| | | |
|---|---|---|
| CN | 1744554 A | 3/2006 |
| CN | 102667761 A | 9/2012 |

(Continued)

OTHER PUBLICATIONS

Subsets & Proper Subset, Philosophy Index, http://www.philosophy-index.com/logic/terms/subset.php (Year: 2019).*

(Continued)

*Primary Examiner* — Mahran Y Abu Roumi
(74) *Attorney, Agent, or Firm* — Buckley, Maschoff & Talwalkar LLC (57) ABSTRACT

Embodiments are directed to communicating between computing nodes in a cluster of nodes. In one scenario, a computer system receives a data packet from a worker node including the worker node's current workload identifiers and health status, where the data packet includes an associated version number. The computer system determines that the version number in the received data packet is different than a previously received data packet and evaluates the worker node's current workload configuration to determine whether workload changes are to be made on the worker node. Then, upon determining that workload changes are to be made on the worker node, the computer system selects a subset of workload changes to apply to the worker node, generates an indication of the selected subset of workload changes to the worker node and sends the generated indication of workload changes to the worker node.

14 Claims, 6 Drawing Sheets

(51) Int. Cl.
  H04L 67/10        (2022.01)
  H04L 43/0876      (2022.01)
  H04L 43/0817      (2022.01)
  H04L 43/10        (2022.01)
  G06F 9/48         (2006.01)
  G06F 9/50         (2006.01)
  H04L 43/0823      (2022.01)
  H04L 41/0654      (2022.01)

(52) U.S. Cl.
  CPC ........ *G06F 9/5088* (2013.01); *H04L 43/0817* (2013.01); *H04L 43/0823* (2013.01); *H04L 43/0876* (2013.01); *H04L 43/10* (2013.01); *H04L 41/0654* (2013.01)

(58) Field of Classification Search
  CPC ........... H04L 29/08981; H04L 41/0213; H04L 41/22; H04L 41/12
  USPC ...................................................... 709/223
  See application file for complete search history.

(56) References Cited

U.S. PATENT DOCUMENTS

| | | | |
|---|---|---|---|
| 7,706,361 | B2 | 4/2010 | McMillen et al. |
| 7,987,152 | B1* | 7/2011 | Gadir ............... G06F 17/30566 707/602 |
| 8,316,113 | B2 | 11/2012 | Linden et al. |
| 8,621,054 | B2* | 12/2013 | Maruyama ................ G06F 8/65 709/223 |
| 2004/0199512 | A1 | 10/2004 | Cornwell et al. |
| 2005/0188075 | A1 | 8/2005 | Dias et al. |
| 2005/0237926 | A1 | 10/2005 | Cheng et al. |
| 2006/0053216 | A1 | 3/2006 | Deokar et al. |
| 2006/0136929 | A1* | 6/2006 | Miller .................. G06F 9/5083 718/105 |
| 2009/0193059 | A1* | 7/2009 | Wall .................... G06F 11/2094 |
| 2009/0225763 | A1 | 9/2009 | Forsberg et al. |
| 2010/0162036 | A1 | 6/2010 | Linden et al. |
| 2010/0198955 | A1* | 8/2010 | Maruyama ................ G06F 8/65 709/223 |
| 2011/0228668 | A1 | 9/2011 | Pillai et al. |
| 2012/0151018 | A1 | 6/2012 | Bacher et al. |
| 2012/0166645 | A1 | 6/2012 | Boldyrev et al. |
| 2012/0209937 | A1 | 8/2012 | Bacher et al. |
| 2012/0297249 | A1* | 11/2012 | Yang ..................... G06F 9/5072 714/19 |
| 2014/0007092 | A1* | 1/2014 | Barbee .................. G06F 9/4856 718/1 |
| 2014/0047342 | A1* | 2/2014 | Breternitz ............. G06F 9/5061 715/735 |
| 2014/0053149 | A1 | 2/2014 | Wu et al. |
| 2014/0149485 | A1* | 5/2014 | Sharma ................... H04L 67/02 709/202 |
| 2016/0005262 | A1 | 1/2016 | Hirato et al. |
| 2016/0050123 | A1 | 2/2016 | Nishanov et al. |

FOREIGN PATENT DOCUMENTS

| | | |
|---|---|---|
| CN | 103064765 A | 4/2013 |
| CN | 103810136 A | 5/2014 |
| EP | 0464014 | 1/1992 |
| WO | WO 2006135466 A2 | 12/2006 |

OTHER PUBLICATIONS

Patch (computing), Wikipedia, https://en.wikipedia.org/wiki/Patch_(computing) (attached, last checked on Jul. 17, 2019) (Year: 2019).*
Aoki, et al., "Autonomically-Adapting Master-Worker Programming Framework for Multi-Layered Grid-of-Clusters", In Proceedings of HPC Asia, Jan. 2007, 8 pages.
"International Search Report & Written Opinion Issued in PCT Application No. PCT/US2015/044313", dated Nov. 13, 2015, 11 pages.
"Second Written Opinion Issued in PCT Application No. PCT/US2015/044313", dated May 30, 2016, 5 pages.
Office Action dated Jun. 15, 2016 cited in U.S. Appl. No. 14/459,066.
"Second Written Opinion Issued in PCT Application No. PCT/US2015/044398", dated Jun. 6, 2016, 6 pages.
Office Action dated Dec. 22, 2016 cited in U.S. Appl. No. 14/459,066.
"International Preliminary Report on Patentability Issued in PCT Application No. PCT/US2015/044313", dated Oct. 11, 2016, 8 Pages.
"International Preliminary Report on Patentability Issued in PCT Application No. PCT/US2015/044398", dated Aug. 30, 2016, 7 pages.
"International Search Report & Written Opinion issued in PCT Application No. PCT/US2015/044398", dated Jan. 25, 2016, 20 pages.
Office Action dated Oct. 5, 2017 cited in U.S. Appl. No. 14/459,066.
"Office Action Issued In European Patent Application No. 15750596.7", dated Apr. 12, 2018, 5 Pages.
Tu, et al., "Speedy Transactions in Multicore in-memory Databases", In Proceedings of the ACM Twenty-Fourth Symposium on Operating Systems Principles, Jan. 1, 2013, 15 Pages.
"Office Action Issued in European Patent Application No. 15750599.1", dated Aug. 21, 2018, 6 Pages.
"First Office Action and Search Report Issued in Chinese Patent Application No. 201580043261.4", dated Oct. 8, 2019, 31 Pages.
"First Office Action and Search Report Issued in Chinese Patent Application No. 201580043509.7", dated Sep. 24, 2019, 11 Pages.
"Summons to Attend Oral Proceedings in European Patent Application No. 15750596.7", dated Apr. 22, 2020.
Deshpande, et al., "Inter-Rack Live Migration of Multiple Virtual Machines", In Proceedings of the 6th International Workshop on Virtualization Technologies in Distributed Computing Date, Jun. 18, 2012, 8 Pages.
Yapicioglu, et al., "A Traffic-Aware Virtual Machine Placement Method for Cloud Data Centers", In Proceedings of 6th International Conference on Utility and Cloud Computing, Dec. 9, 2013, pp. 299-301.
"Second Office Action Issued in Chinese Patent Application No. 201580043261.4", dated Mar. 17, 2020, 22 Pages.

* cited by examiner

SCALABLE FAULT RESILIENT COMMUNICATIONS WITHIN DISTRIBUTED CLUSTERS

CROSS-REFERENCE TO RELATED APPLICATIONS

This application is related to U.S. patent application Ser. No. 14/459,066, entitled "Fault Tolerant Federation of Computing Clusters", filed on Aug. 13, 2014.

BACKGROUND

Computing systems have become ubiquitous, ranging from small embedded devices to phones and tablets to PCs and backend servers. Each of these computing systems is designed to process software code. The software allows users to perform functions, interacting with the hardware provided by the computing system. In some cases, these computing systems may be linked together to form a cloud of computing resources. These cloud resources may include hosting, processing, data storage or other services. These cloud resources are designed to be fault tolerant such that one computing system can immediately replace another when needed. Such fault tolerant systems, however, may generate large amounts of intra-cloud network traffic ensuring that systems are functioning properly.

BRIEF SUMMARY

Embodiments described herein are directed to communicating between computing nodes in a cluster of nodes. In one embodiment, a computer system (e.g. a master node) receives a data packet from a worker node including the worker node's current workload identifier(s) and health status, where the data packet includes an associated version number. The computer system determines that the version number in the received data packet is different than the version of the latest workload configuration previously sent to the worker node and evaluates the worker node's current workload configuration to determine whether workload changes are to be made on the worker node. Then, upon determining that workload changes are to be made on the worker node, the computer system selects a subset of workload changes to apply to the worker node, generates an indication of the selected subset of workload changes to the worker node and sends the generated indication of workload changes to the worker node.

In another embodiment, a computer system (e.g. a worker node) generates a data packet that includes a listing of workload identifiers (IDs) for which a worker node is responsible. The data packet also includes a version number and workload health status for each workload ID. The computer system sends the generated data packet to a master node in the cluster of nodes and receives a delta data packet that includes information specifying a subset of selected changes that are to be applied to at least one of the worker node's workloads. The computer system then applies the selected subset of workload changes to the workload on the worker node.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to communicating between computing nodes in a cluster of nodes. In one embodiment, a computer system (e.g. a master node) receives a data packet from a worker node identifying the worker node's current workload identifiers and health status, where the data packet includes an associated version number. The computer system determines that the version number in the received data packet is different than a previously received data packet and evaluates the worker node's current workload configuration to determine whether workload changes are to be made on the worker node. Then, upon determining that workload changes are to be made on the worker node, the computer system selects a subset of workload changes to apply to the worker node, generates an indication of the selected subset of workload changes to the worker node and sends the generated indication of workload changes to the worker node.

In another embodiment, a computer system generates a data packet that includes a listing of workload identifiers (IDs) for which a worker node is responsible. The data packet also includes a version number and workload health status for each workload ID. The computer system sends the generated data packet to a master node in the cluster of nodes and receives a delta data packet that includes information specifying a subset of selected changes that are to be applied to at least one of the worker node's workloads. The computer system then applies the selected subset of workload changes specified in the delta data packet to the at least one workload on the worker node.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may implement various types of computing systems. These computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

Figure 1:
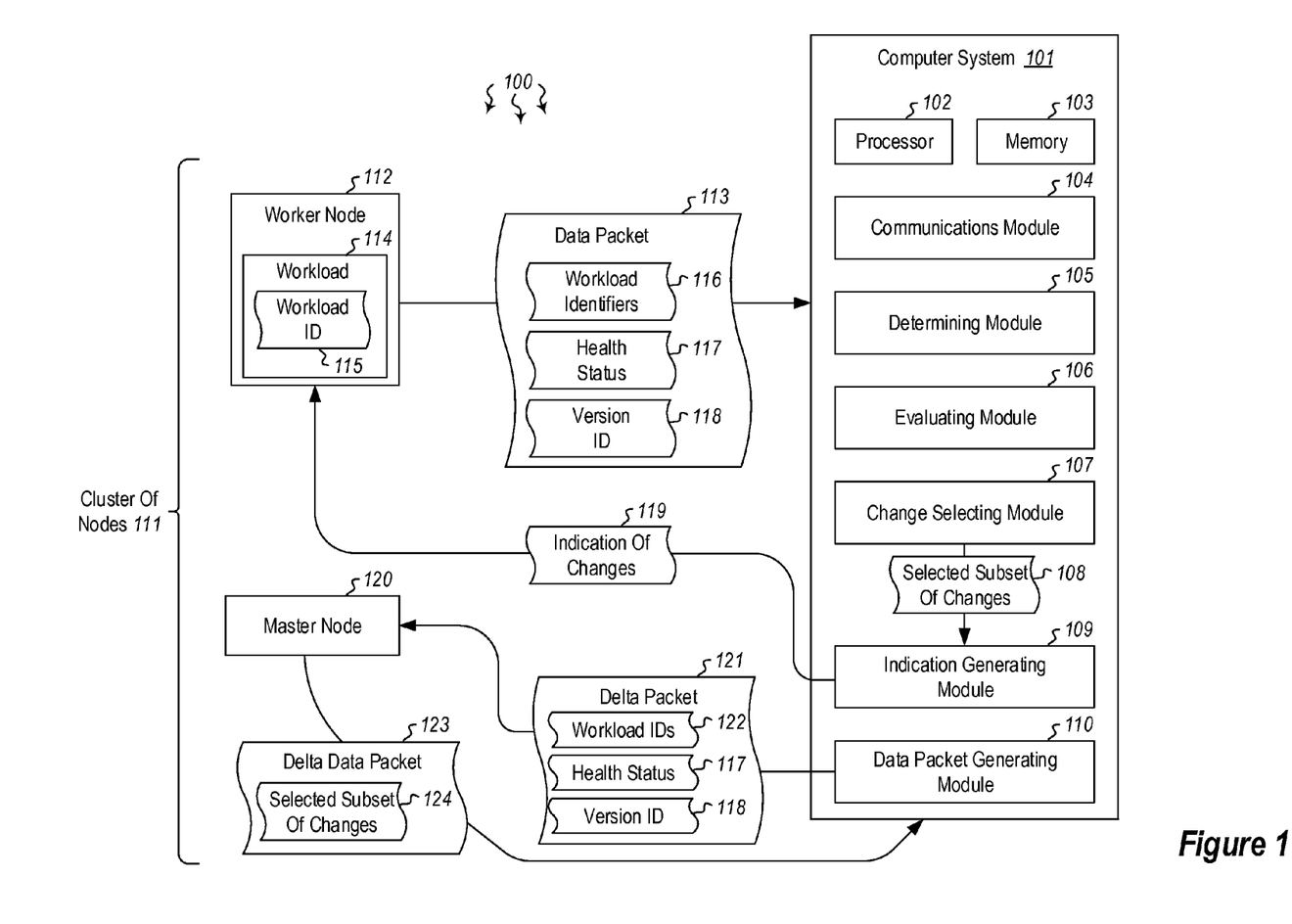
FIG. 1 illustrates a computer architecture in which embodiments described herein may operate including communicating between computing nodes in a cluster of nodes.

As illustrated in FIG. 1, a computing system 101 typically includes at least one processing unit 102 and memory 103. The memory 103 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 103 of the computing system 101. Computing system 101 may also contain communication channels that allow the computing system 101 to communicate with other message processors over a wired or wireless network.

Embodiments described herein may comprise or utilize a special-purpose or general-purpose computer system that includes computer hardware, such as, for example, one or more processors and system memory, as discussed in greater detail below. The system memory may be included within the overall memory 103. The system memory may also be referred to as "main memory", and includes memory locations that are addressable by the at least one processing unit 102 over a memory bus in which case the address location is asserted on the memory bus itself. System memory has been traditionally volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer system 101. Computer system 101 may be any type of local or distributed computer system, including a cloud computing system. The computer system 101 includes modules for performing a variety of different functions. For instance, the communications module 104 may be configured to communicate with other computing systems. The communications module 104 may include any wired or wireless communication means that can receive and/or transmit data to or from other computing systems. The communications module 104 may be configured to interact with databases, mobile computing devices (such as mobile phones or tablets), embedded or other types of computing systems.

The computer system 101 may include other modules including the determining module 105, the evaluating module 106 and the change selecting module 107. Each of these modules performs certain functions that will be explained further below. In some embodiments, an administrative or other user may desire to organize a group of computing nodes into a federated cluster (e.g. cluster 111). The user may provide input indicating how many nodes of each type are to be in the cluster federation. As the term is used herein, a "cluster federation" or "federated cluster" refers to an aggregation of multiple independent clusters collaborating together to provide federation-wide services and also retain an ability of individual clusters to continue operating even during loss of connection with other cluster and/or failure of other clusters. Each cluster is made up of one or more physical computing nodes which may include computing systems such as server blades, hardware processors or processing cores, mainframe, embedded or other types of computing systems. Thus, clusters are collections of computing systems that work together to run workloads and fail over as needed to provide fault tolerance. The cluster federation may include various types of clusters including master clusters and worker clusters.

A "master cluster" as referred to herein is a cluster that runs software components that are responsible for monitoring worker clusters and making failover decisions. A "worker cluster" as referred to herein is a cluster that runs assigned workloads. The worker cluster will attempt local failover within the nodes of the worker cluster. If the worker cluster fails to transfer the workload, a master cluster can be used to host the workload. A "master agent" is a software component hosted on a master cluster that implements the control and monitoring logic of the federation. A "worker agent" is a software component hosted on a worker cluster which accepts assignments from the master cluster and provides status updates to a master cluster. A "workload" is a software application or service or other portion of code running on a cluster node that can be failed over to other cluster nodes as needed. "Failing over" includes the ability to quickly transfer a workload from one cluster node to another in case of a failure, or to a more desirable cluster node for performance, load balancing or other reasons.

Embodiments herein federate clusters of any type and can be used with substantially any clustering solutions that allow workloads to be hosted on computing nodes and provide failover of workloads in case of hardware or software failures. The embodiments provide a fault tolerant store (e.g. a cluster database) that allows agents running on a master cluster to persist information used to run the cluster federation 110. Master agent software hosted on a master cluster may be split into a director component which is active only at one master cluster node at a time, and leader components which monitor and control other nodes, and which are active on other cluster nodes. Worker nodes and master nodes may have different roles assigned to them at different times, and the computing nodes themselves may be reassigned to being worker nodes or master nodes. In some embodiments, master and worker roles may coexist on the same computing system (i.e. a master node may also host workloads).

The director role (or simply "director" herein) is configured to make decisions including, but not limited to, the following: 1) Which leaders are responsible for which worker clusters, 2) Which worker nodes are responsible for hosting which workloads, 3) Deciding to promote a node from a worker cluster to withdraw from its current worker cluster and join a master cluster, or to demote a master node so that it becomes a worker node and joins a worker cluster. This allows a nearly instant replacement of a failed computing node on master or worker cluster from the pool of computing nodes in their respective clusters. The director role records its decisions in a cluster database (which may be local or remote to the master cluster. Leader roles (or "leaders" herein) monitor changes to the cluster database and learn whether they need to communicate director decisions to the worker clusters they are responsible for. Leaders send assignments to worker clusters and receive status updates from worker nodes. If a leader has not received a status update within a predetermined time out interval (whether measured in seconds, minutes, hours, etc.), the leader will interpret the lack of response as a failure and will record the failure in the cluster database.

In some embodiments, the director may learn about the failure of a worker and decide on how to redistribute workloads hosted by the worker. Once the decision regarding redistribution of workloads has been made, the director will record the decision in the cluster database. Leaders may then learn about the new workload and communicate that to the worker clusters they are responsible for. In the case of a leader failure, the director may learn about it via a notification delivered by the master cluster which reports on master node down or up events. When the director learns about a master node failure, the director redistributes worker cluster nodes monitored by that particular master cluster node among the remaining master cluster nodes. The director then writes this decision in the master database. Leaders will learn about the decision via database notification changes and start monitoring and controlling newly acquired worker clusters.

When a failed master cluster node comes back online, it informs the director that it is available for monitoring by recording its state as online in the cluster database. The master learns about this and redistributes some worker clusters to a new master cluster node to better spread the monitoring and controlling load on master cluster nodes. If a failed master cluster node is not coming online in a predetermined period of time, and the number of active master cluster node falls below the desired threshold of number of active master cluster nodes, the director can choose to remove a node from a worker cluster and join it to the master cluster to a retain desired degree of redundancy in the master cluster. The opposite operation is also possible, if the number of worker clusters monitored is small, the director can choose to remove a node from the master cluster and rejoin a worker cluster (or form a new worker cluster). Worker clusters can be one node clusters or multi-node clusters. In multi-node worker clusters, a failed workload will be attempted to be restarted on other nodes of the worker cluster. Once recovery attempts by the worker cluster are exhausted, a worker agent running on a worker cluster can request master cluster help with transferring the failed workload elsewhere.

To host workloads on a distributed system of thousands of nodes (or more), a scalable fault resilient protocol is used to handle communications between the thousands of hosting nodes and the nodes monitoring them. It is also important that the network bandwidth taken by these control packets as well as the CPU processing incurred on both the hosting nodes and the monitoring nodes be low. Embodiments described herein provide a protocol which ensures highly scalable fault resilient communication in a massively scalable distributed cluster system. The hosting nodes send status for the workloads in a way such that the information is concise. At the same time, the monitoring nodes, instead of sending all of the information available regarding a workload (such as a virtual machine (VM)), send only the information needed to ensure that the hosting nodes bring the worker nodes to the appropriate state. At the same time, the protocol described herein ensures that it can tolerate packet losses and also communicate across different network adapters in case of failures in some communication paths. Higher scalability is further achieved by throttling messages and piggybacking on other messages where appropriate.

In some embodiments, the fault tolerant communication protocol provides an upper bound on the number of packets sent or received by the monitoring and hosting node per second, optimizes the size of the total information exchanged between monitoring and hosting nodes, avoids sending configuration or status information that has not changed from monitoring to host nodes or from host nodes to monitoring nodes, is resilient to packet losses, and helps worker nodes monitor the health of remote endpoints on the master node so that the master node can send packets to the reachable endpoints. Both master and hosting nodes can tolerate failure of all but one network interface controller (NIC), as will be further explained below. Moreover, the protocol allows for load balancing of network traffic among available NICs, allows aster nodes to detect failure of worker nodes in a configurable amount of time, and allows randomization of traffic so that the worker nodes don't send heartbeat packets at the same time causing a spike in network traffic.

As the term is used herein, a "heartbeat packet" refers to a data packet (e.g. a brevity serialized user datagram protocol (UDP) packet) that is sent periodically by a worker node to a master node to provide information about the workloads running on the worker node (e.g. workload 114 on worker node 112). An "assignment packet", as used herein, refers to a data packet (e.g. a brevity serialized UDP packet) that is sent by a master node in response to the heartbeat packet only if the information about the configuration of workload(s) on the worker node has changed since the last time heartbeat packet was received. Thus, as shown in FIG. 1, a worker node 112 may send a data packet 113 (i.e. a heartbeat packet) that includes information including workload identifiers 116, the current health status 117 of the worker node, and a version identifier 118 for the data packet. The assignment packet may include an indication of changes 119 that are to be applied to the worker node 112.

Master node 120 may be configured to be aware of all the worker nodes it is supposed to manage. The master node periodically sends a welcome packet to all the worker nodes (e.g. 112) whose lease has expired (i.e. worker nodes for whom the master node 120 hasn't received a single heartbeat packet in the stipulated timeout interval). When a worker node receives a welcome packet, it starts sending heartbeats periodically to the master node which sent it the welcome packet. The heartbeat packet 113 includes various types of information depending on which embodiment is implemented. As will be explained further below, in at least one embodiment, the heartbeat packet may include a sequence number, a health status and a configuration version identifier 118 which is associated with the workload configuration. The version number is incremented each time a workload configuration change occurs.

When a master node (or "leader" herein) responsible for a worker receives a heartbeat packet and validates that the sequence number is higher than the last one received, the leader compares which workloads the worker node 112 is hosting with which workloads it is supposed to own. The master node also checks whether versions associated with the workloads match the latest version in the master cluster database. After this comparison, the leader knows the set of workloads that are to be added to the worker, removed from the worker, or changed on the worker node. The leader chooses a subset from the added, deleted or changed workloads, and forms an assignment packet and sends it to the worker node. It should be noted herein that the term "subset"

refers to a set of items that may be selected from an existing set, and does not include an "empty subset" with zero items. A determination of how many items to include in the subset depends on how much bandwidth will be consumed (i.e. how big the assignment data packet will be). If the number of additions, deletions or changes is too large, the subset may be chosen so as to keep the assignment packet below a specified size. In some cases, the assignment packet may be kept below the maximum transmission unit (MTU) size to avoid fragmentation. As long as the leader sends information about at least one workload in each assignment packet, the protocol converges and the worker eventually learns about every workload it is supposed to own and removes all the workloads it is not supposed to own.

The fault tolerant, scalable protocol described herein is resilient to losses by duplicating and reordering delivery of heartbeat and/or assignment packets. When the master node 120 has information it is supposed to send to one or more worker nodes, cases may arise in which assignments for some worker nodes are more important than assignments for other worker nodes (e.g. because one assignment deals with higher priority workloads as compared to others). To ensure that high priority assignments are delivered first, the master node pushes the high priority assignments into a high priority queue, and normal assignments into a lower priority queue. The master node may be configured to complete the assignments on the high priority queue before sending assignment packets from lower priority queue. This ensures that in cases where assignments are time-critical, those assignments are sent first.

Using the protocol described herein, worker and master nodes can tolerate failure of one or more network interfaces and/or communication paths. Just as the assignment packet contains information about the workloads for a worker and the corresponding version number, it also includes a list of network interfaces, a list of internet protocol (IP) addresses and a version number associated with this information. When a worker gets an assignment packet, it compares the version information for the interfaces with the local version information. If the version of the information sent by the master node is greater than that at the worker node, the worker node knows that one or more IP addresses have changed since the last time it received that information. The worker node updates its version number and the subsequent heartbeat packets have the updated information. When the master receives the next heartbeat packet with updated version, it knows that the worker has an up-to-date IP address list and it doesn't need to communicate that information to the worker node until the next time an IP address change occurs on the master node.

Based on this list of IP addresses of the master, the worker node compares the list of IP addresses available locally and identifies multiple communication routes to provide maximum redundancy. For example, if master node 120 had two interfaces on two subnets and the worker node 112 has two interfaces on the same two subnets, the worker node may pick one IP address from each interface of the master node for communication. If the master node had three interfaces on three subnets, and the worker node had the same configuration as in the previous example, the worker choses one IP address from each interface on the master node to communicate and allows the network stack to decide which local interface to use when sending communications to a remote IP address. This will be explained further below with regard to FIG. 6.

When determining the health of a communication route, each remote endpoint selected for communication may start with an arbitrary weight (e.g. 100) indicating that the worker node believes all endpoints to be healthy. Every 60 seconds (or at some other configurable time interval), the worker node may initiate ACK based semantics for the next n heartbeat packets, where n is the number of remote endpoints. As such, even if the information on the worker node is up to date, the master node responds with an ACK if it receives the packet. To minimize the effect that a temporary network glitch might have on health monitoring (e.g. if two interfaces share same network switch), the ACK based semantics are spread out over the time interval (60 seconds in this example). Accordingly, if a worker has three remote interfaces for the master node, the three heartbeats would be spaced at 20 second intervals.

When a worker node doesn't get an ACK from a remote endpoint (interface) for a heartbeat packet it sought an ACK for, the worker node decrements the weight of the endpoint by certain amount. Then, at each time interval, when the worker sends a heartbeat packet, the worker node may implement a round-robin approach to select the next available endpoint. Then the weight of the endpoint is considered. If the weight is 100, the heartbeat is sent using that endpoint. If not, the worker generates a random number between 0 and 100. If the generated random number falls in the range [0, <endpoint_weight>], that particular endpoint is used for communication for this time interval. Otherwise, the next endpoint is selected and the same approach is followed. If the weight for an endpoint becomes zero, that endpoint is used to send an assignment packet only if the endpoint is seeking an ACK for that packet (in the above example, once every 60 seconds until its score increases). As remote endpoints are penalized for not responding to an ACK-requested heartbeat, the endpoint is also rewarded if the ACK is received by incrementing the weight (although in the example above, the weight cannot be more than 100).

This approach minimizes the amount of network traffic and ensures that the master node would get a heartbeat packet in n time intervals (n being the number of available remote endpoints) if at least one remote endpoint is reachable. If all the available endpoints are healthy, using a round-robin approach automatically allows for load distribution over available interfaces. A master replies to a heartbeat packet on the same endpoint it received the heartbeat from. To ensure that packets from many different worker nodes don't reach the master node at roughly the same time, each worker node may add a random number, chosen from the range [0, delta] to the time interval. At least in some embodiments, this delta value would typically be less than the time interval. It should also be noted that some configuration parameters corresponding to workloads change less (e.g. workload state) as compared to others (e.g. memory usage by the workload). To minimize the amount of data sent in each heartbeat for each workload, the configuration parameters for a workload are split into two groups. Only information corresponding to the parameters that change more often are sent in every heartbeat. These concepts will be explained further below with regard to methods 200 and 300 of FIGS. 2 and 3, respectively.

Figure 2:
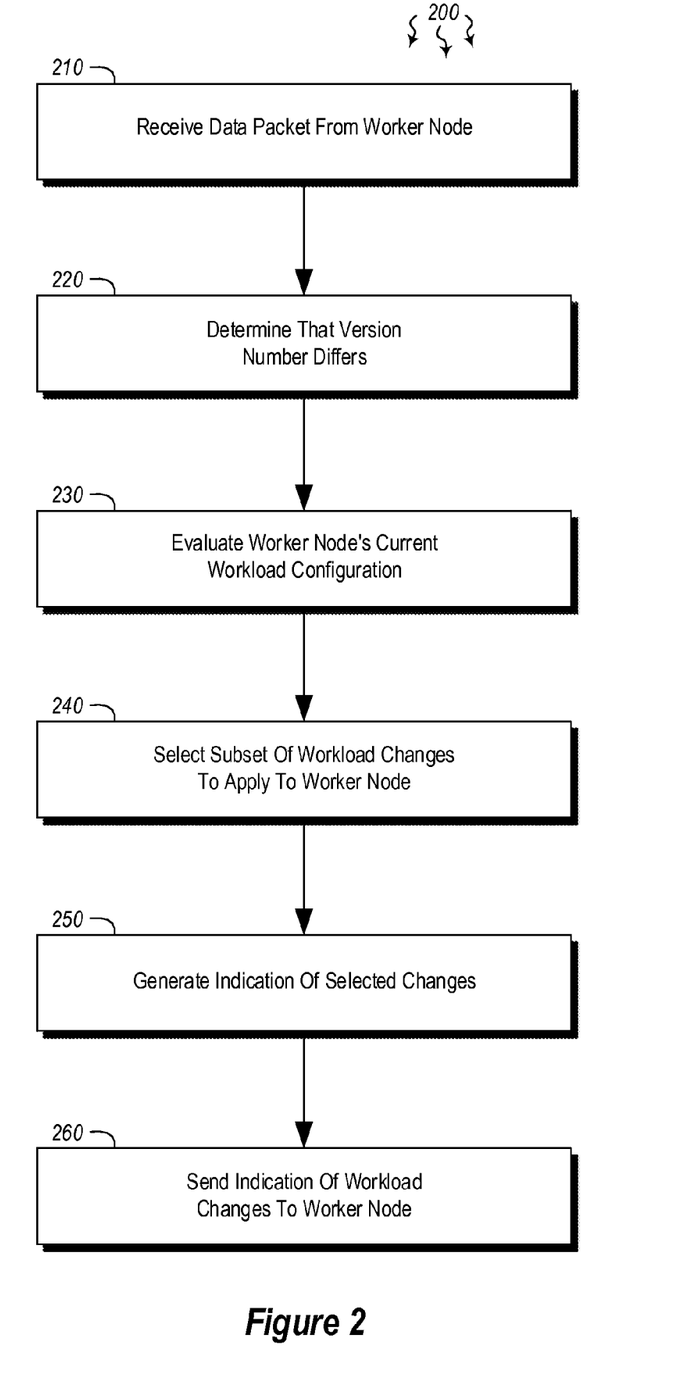
FIG. 2 illustrates a flowchart of an example method for communicating between computing nodes in a cluster of nodes.
Figure 3:
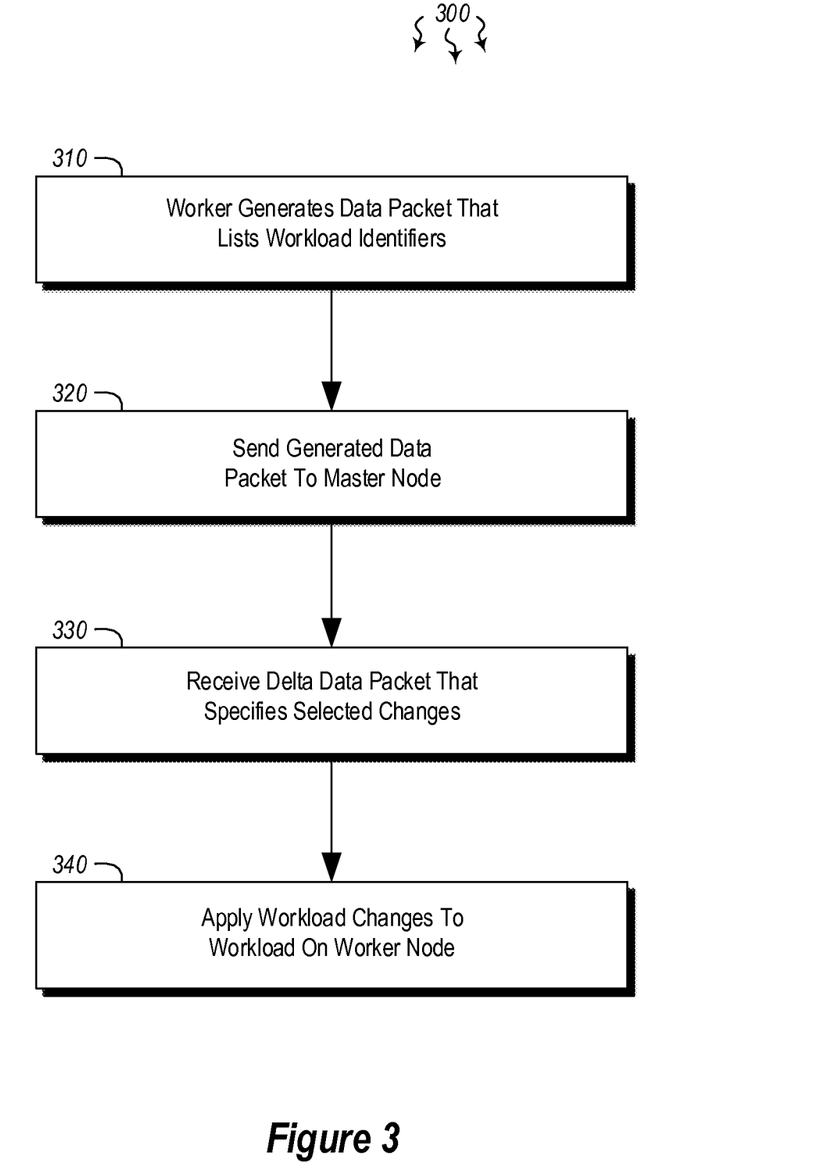
FIG. 3 illustrates a flowchart of an alternative example method for communicating between computing nodes in a cluster of nodes.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for communicating between computing nodes in a cluster of nodes. The method 200 will now be described with frequent reference to the components and data of environment 100.

Method 200 includes an act of receiving a data packet from a worker node identifying the worker node's current workload identifiers and health status, the data packet including an associated version identifier (act 210). For example, the communications module 104 of computer system 101 may receive data packet 113 from worker node 112. The data packet 113 may be a heartbeat packet that informs the computer system 101 that the worker node 112 is still alive and functioning. The heartbeat packet may include various types of information including workload identifiers 116 that identify worker node 112's current workloads (e.g. the number and type of virtual machines or other applications or services that are running) The workload identifiers 116 may include a plurality of individual workload identifier 115 for each workload 114 (e.g. VM, application, service or other workload). Alternatively, the workload identifiers 116 may include a single identifier for a group of workloads that is being processed by the worker node 112.

The heartbeat packet may further include an indication of the worker node's health status 117 as a version identifier 118 which may be a number or other type of identifier. The version identifier identifies which version of workload configuration the worker node is currently running. If the computer system 101 (which may be a master node in some embodiments) determines that the worker node is running an out-of-date workload configuration (as evidenced by a version identifier that is older than a current version propagated by the master node), then the computer system 101 knows to send an updated workload configuration in the indication of changes 119.

It should be noted that different embodiments may involve the transfer of different information in a heartbeat packet such as data packet 113. For example, in some cases, worker node 112 may send a full workload configuration and health status 117 in the heartbeat packet. In other cases, the worker node 112 may send workload identifiers 116 for the workloads running on the worker node, along with the health status 117 and a version ID 118. In still other cases, the worker node 112 may send workload identifiers 116 and a version identifier 118, and in other cases, may send just a version ID 118 that identifies which workload configuration version the worker node 112 is running. In the latter case. If the workload configuration and state remain the same, future heartbeat data packets could include only the global version number. Thus, many different options and optimizations are envisioned, and any worker node may implement any of the above embodiments at any given time.

Method 200 further includes an act of determining that the version identifier in the received data packet is different than a previously received data packet (act 220). The determining module 105 of computer system 101 may determine that the version ID 118 is different than a previously received heartbeat data packet. For instance, the version ID may be a version number such as "Version 31" or "Version 6.0.1". In one packet the version may be 6.0.1 and in the next packet, it may have been incremented to show that a change has occurred. Thus, subsequent heartbeat packets will include 6.0.2 as their version identifier, and so on until another change occurs and it is incremented to 6.0.3. Regardless of which numbering, lettering or naming scheme is used for the version identifier, if there is a difference in the identifier between packets, the computer system 101 will be notified that a workload configuration change has occurred (e.g. a workload was added, removed or changed in some manner), and if the worker node is still not on the most recent workload configuration version, the computer system 101 can continue to send updated changes in assignment packet 119.

Method 200 next includes an act of evaluating the worker node's current workload configuration to determine whether workload changes are to be made on the worker node (act 230). The evaluating module 106 of computer system 101 may access the workload configuration or simply the workload identifiers 116 to determine whether workload changes are to be made on the worker node. For instance, the evaluating module 106 may compare the worker node's current workload configuration against a master node's indication of which workloads are to be processed by the worker node 112. If the master node's indication of which workloads are to be processed by the worker node is different than the received workload configuration, the master node can provide updated changes that are to be applied on the worker node 112 to bring it up-to-date with the master node.

Once it has been determined that workload changes are to be made on the worker node, method 200 includes acts of selecting a subset of workload changes to apply to the worker node (act 240), generating an indication of the selected subset of workload changes to the worker node (act 250), and sending the generated indication of workload changes to the worker node (act 260). The change selecting module 107 of computer system 101 may select which changes are to be propagated to the worker node 112. As mentioned above, it may be advantageous in terms of network bandwidth to avoid exceeding a maximum transmission unit (MTU) for the protocol being used to transfer data packets. As such, the changes selected may be based on priority (higher priority changes are made first) or data size, so as not to exceed the MTU for a given data packet. If a given update packet does not include all of the changes that are to be eventually propagated to the worker node(s), the protocol will still ultimately provide all of the changes—it may just take more data packets and more time. Eventually, all of the workload changes will be propagated through assignment packets to the worker nodes, while not exceeding bandwidth limits or transmission unit limits.

Accordingly, a fault tolerant communication protocol may be used to propagate workload changes among worker nodes. In some embodiments, the fault tolerant protocol may specify an upper bound on the number of data packets that are transmitted or received by the computing system 101 per time period. The upper bound may control, for example, the number of heartbeat packets 113 that are received from one or more worker nodes within a minute, hour, day or other time period. Additionally or alternatively, the upper bound specified by the protocol may indicate that the number of assignment packets (e.g. 119) is to be below a certain number within a specified time period. In some cases, the upper bound may be based on the number of master and worker nodes, such that in cases where there is a very large number of nodes, the upper bound may be higher than in cases where fewer nodes are present. Additionally or alternatively, an different upper bound may be specified for each protocol that is used to communicate data packets within the computing environment 100.

In some embodiments, the determining module 105 of computer system 101 may determine that a bandwidth limitation applies to the indication of workload changes 119 and may divide the selected subset of workload changes into at least two indication messages. These workload changes may include adding workloads (such as VMs) to the worker node 112, removing workloads from the worker node or changing one or more workloads on the worker node. Changes to a workload may include changing the processing priority of the workload, changing the number of processing cores assigned to the workload or changing other settings that affect how a workload is being hosted or processed on the worker node.

The indication generating module 109 of computer system 101 generates the indication of changes 119 based on the selected subset of changes 108 received from the change selecting module 107. The indication of changes 119 sent to the worker node 112 may represent the delta between the worker node's indication of workload configuration and the master node's indication of which workloads are to be processed by the worker node. The indication of changes may further include an updated version number that indicates to the worker node that workload updates are to be applied. Thus, for example, a worker may send a heartbeat packet indicating that it is currently processing four workloads, and the indication of changes 119 may indicate that a fifth workload is to be processed on the worker node. As such, the worker node will begin processing the identified fifth workload. Each workload may be identified using a workload ID 115. As such, the master node may compare a list of workload IDs and send an assignment that says to remove a certain workload ID, add a certain workload ID or change a workload based on its identifier.

In some cases, the generated indication of workload changes (i.e. 119) is sent to the worker node as part of a status query message. Thus, instead of sending a separate assignment message, the changes may be sent as part of another status query message that would normally be sent as part of regular operating procedures. This status query message may be sent to the worker node at a specified interval that corresponds to a priority level for the workload being processed by the worker node. For example, if the workload is high priority, status updates will be sent more often to ensure that the workload is being processed as expected. Fewer status updates may be sent for lower priority workloads, as status updates are not as urgent. The interval at which status query message are sent to the worker node may change dynamically according to the priority level specified for the workload. If the workload's priority increases, the frequency of status updates may also increase. Similarly, if the workload's priority decreases, the frequency of status updates may correspondingly decrease. These changes may be made for each worker node, or for each workload processed by that worker node.

It should be noted that the fault tolerant protocol described above and herein may avoid sending ACK packets and instead may rely solely on incoming heartbeat packets to determine whether the appropriate workloads are being processed by the appropriate worker nodes, what the worker nodes' health statuses are, and whether they are running the latest workload configuration (as indicated by the version number attached to the heartbeat packets). Furthermore, it should be noted that the fault tolerant protocol limits the amount of bandwidth consumed even in the case of cascading failures, and still makes progress propagating a workload configuration even if packets are dropped or even if the packets include only a subset of the changes that are to be made to a workload. Each heartbeat packet and each status request or assignment packet includes version identifiers to let the other node know whether changes need to be made and whether the changes have been applied.

Turning now to FIG. 3, a flowchart is illustrated of a method 300 for communicating between computing nodes in a cluster of nodes. The method 300 will now be described with frequent reference to the components and data of environment 100.

Figure 4:
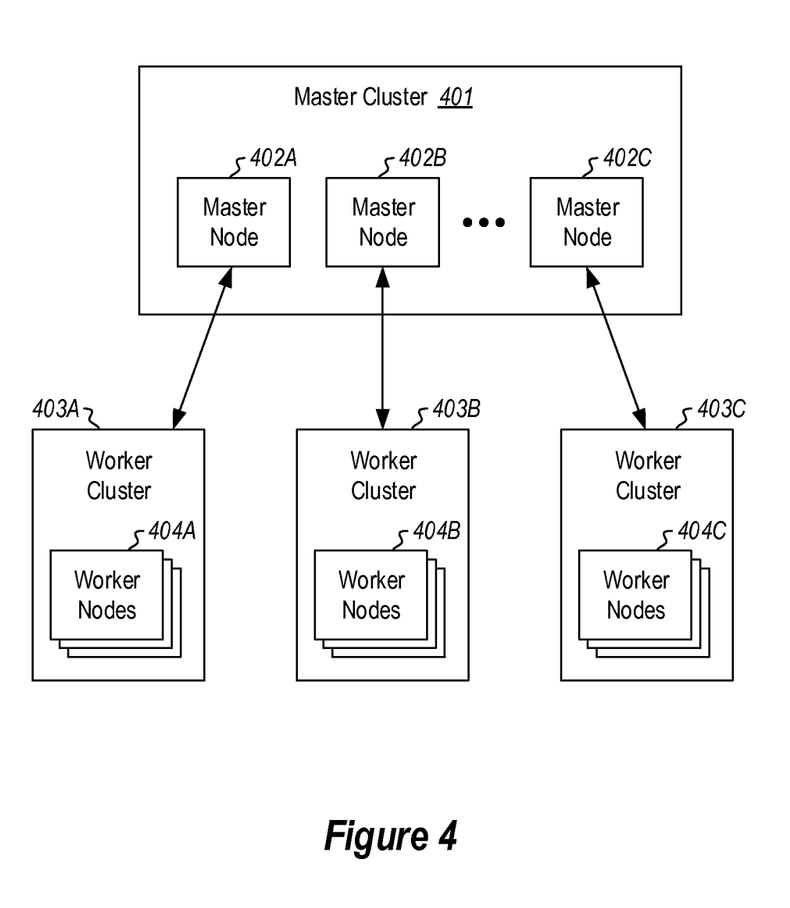
FIG. 4 illustrates an embodiment in which master nodes in a master cluster are monitoring and controlling worker nodes in worker clusters.

Method 300 includes an act of generating a data packet that includes a listing of workload identifiers (IDs) for which a worker node is responsible, the data packet further including a version number and workload health status for each workload ID (act 310). For example, data packet generating module 110 of computer system 101 may generate data packet 121 which includes a listing of workload IDs 122 for which worker node 112 is responsible, a health status 117 for each workload ID and a version ID 118 that identifies which workload configuration is being implemented. The data packet 121 is sent to a master node (e.g. 120) in the cluster of nodes (act 320). For instance, as shown in FIG. 4, a cluster of nodes may include master cluster 401 and one or more worker clusters including 403A, 403B and 403C. The master cluster 401 may include substantially any number of master nodes, including master nodes 402A, 402B and 402C. Each master node may be configured to monitor and control the workloads being processed by the worker nodes 404A, 404B and 404C of their corresponding worker clusters. Accordingly, master node 402A may monitor and control the workloads of worker nodes 404A of worker cluster 403A, and so on.

Method 300 further includes an act of receiving a delta data packet that includes information specifying a subset of selected changes that are to be applied to at least one of the worker node's workloads (act 330). The communications module 104 of computer system 101 may receive delta data packet 123 from master node 120 indicating a subset of selected changes 124 that are to be applied to worker node 112. Additionally or alternatively, the delta data packet 123 may be sent directly to worker node 112. The delta data packet may indicate those workload removals, additions or configuration changes that are to be applied to the workload 114. Each change may be associated with a specific workload ID 115 that identifies which workload the change is to be made to. The selected subset of workload changes specified in the delta data packet may then be applied to the at least one workload on the worker node (act 340).

Figure 5:
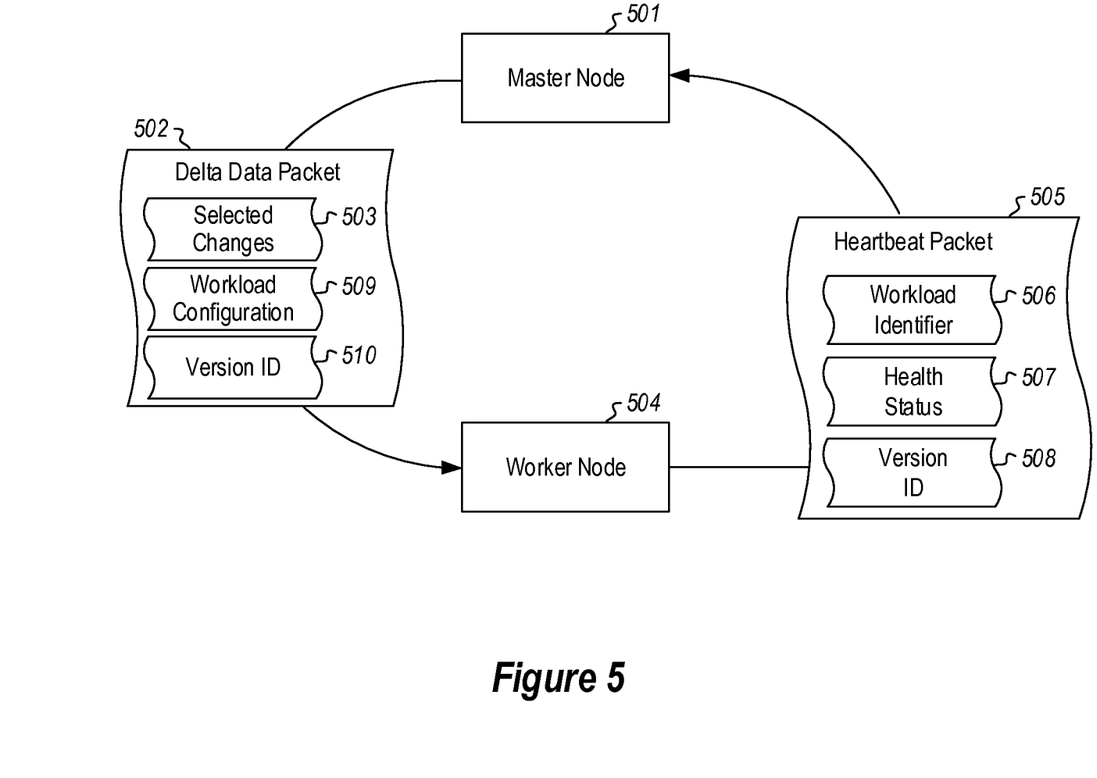
FIG. 5 illustrates an embodiment in which a master node and a worker node communicate using heartbeat packets and delta data packets.

Thus, in this manner, as shown in FIG. 5, a master node 501 may declare a list of changes that are to be applied to a given workload or set of workloads. This listing of changes may appear in delta data packet 502 that specifies the selected changes 503. The delta data packet (or a separate data packet) may also include a workload configuration 509 and a version ID 510. The worker node 504 receives these changes and applies them, updating the version number (e.g. version ID 508) in the heartbeat packets it sends out. The heartbeat packet 505 then goes back to the master node 501, including the current workload identifiers 506 (i.e. identifiers for workloads it is currently processing), its current health status 597 and a version identifier 508 indicating which workload configuration version it is operating on. In this manner, the master node is apprised of each worker node's status each heartbeat interval. If a heartbeat packet is dropped, the master assumes it was a drop and that another heartbeat packet will be received eventually (up until the timeout period at which the master node declares the worker node to be dead and reassigns its workload(s)). Similarly, if a delta or assignment packet is dropped between the master node 501 and the worker node 504, the worker node will continue operating on the old workload configuration until an updated delta packet is received. The heartbeat packets will keep telling the master that the worker is operating under the old version and, as such, the master will keep sending delta packets until the heartbeat indicates the appropriate version.

In some embodiments, the data packet 121 (e.g. a heartbeat packet) is sent to the master node at a randomized time, so that data packets from multiple worker nodes are sent at different times. The randomized time may be based on a specified heartbeat time interval with an added delta time that is between zero and the specified heartbeat time interval. As such, the added delta time spaces out the heartbeat vis a vie the other nodes, resulting in a staggered heartbeat transmission from the worker nodes. In some cases, the data packet 121 is sent using a fault tolerant communication protocol that has been limited by the master node 120 to a specified amount of bandwidth per time period. This bandwidth limit may be specified for each protocol, and each transmission using a given protocol may be randomized to avoid spikes in network traffic.

Figure 6:
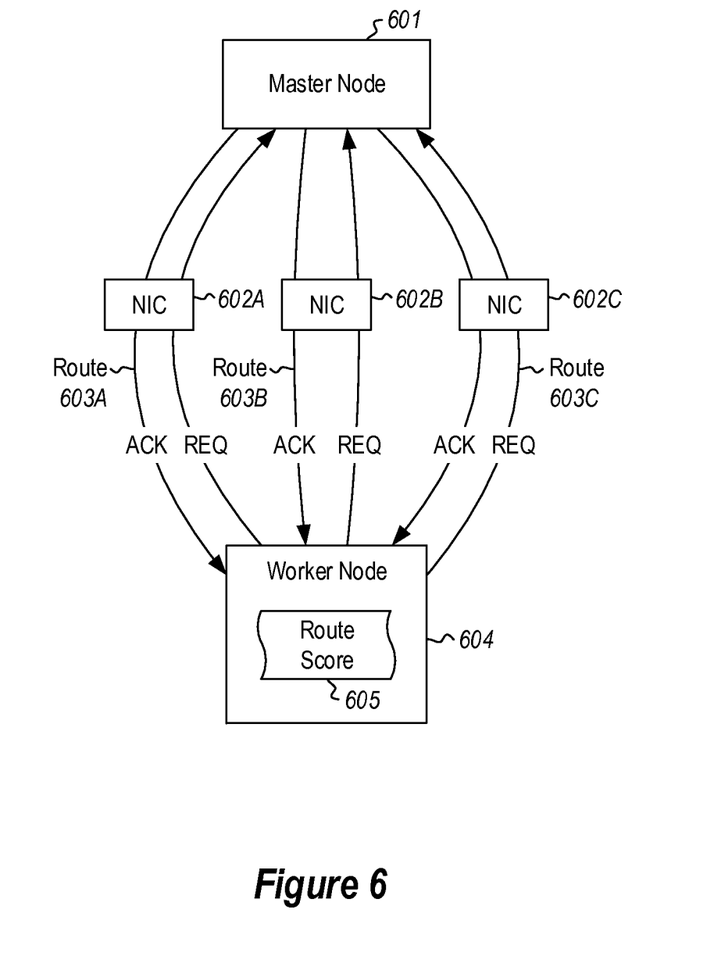
FIG. 6 illustrates an embodiment in which a worker node determines connectivity on physical links between a worker node and a master node.

FIG. 6 illustrates a scenario where a worker node 604 sends status query packets (i.e. status request or REQ packets) to the master node 601 to verify that a physical link between the computing system and the master node is functioning properly. For instance, the worker node 604 may communicate with the master node 601 using different physical routes (e.g. 603A, 603B or 603C). Each route may have different types of physical hardware (in addition to or as an alternative to the NICs shown in FIG. 6) including load balancers, routers, gateways, etc. In the embodiment shown in FIG. 6, the worker may send a REQ on route 603A and receive an acknowledgement (ACK) message acknowledging that the physical route including NIC 602A is functioning properly. Such REQ messages may be sent through NICs 602B and 602C of routes 603B and 603C, respectively. ACK messages may then be received along those routes. The REQ messages may be sent at specified time intervals, which may be more frequent for higher priority workloads or routes.

If the worker node 604 determines that a specified period of time has passed without receiving an ACK packet from the master node 601, it may decrease a corresponding reliability score 605 for the master node and/or the route, where the reliability score indicates the likelihood that the physical link between the master node and the computing system is functioning properly. Once an ACK packet is received from the master node 601, the reliability score for the master node is increased to a maximum level, indicating that the physical link between the master node and the computing system is functioning properly. As such, a worker node may be able to evaluate each route and, if a route stops working, may switch to a new communication route and indicate that physical hardware on the failed route should be repaired or replaced.

In some cases, if a threshold number of master nodes have failed or become unavailable, the worker node may dynamically decrease the amount of time that is allowed to pass without receiving an acknowledgement packet from the master node before the reliability score 605 is reduced. Thus, as a master node's reliability score is reduced, the worker node is less and less willing to wait for acknowledgement packets as it becomes more apparent that the master node has likely failed. In this manner, master and worker nodes may communicate in an efficient and fault tolerant manner that is conscious of bandwidth, and may dynamically adjust to changing circumstances. Accordingly, methods, systems and computer program products are provided herein which facilitate fault tolerant and scalable communication between master and worker nodes.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. At a computer system including at least one processor, a computer-implemented method for communicating workload updates between computing nodes in a cluster of nodes, the method comprising:
   the computer system identifying a worker node, from the cluster of nodes, that has been assigned to host a workload configuration, the workload configuration comprising processing assignments assigned to the worker node;
   the computer system receiving a data packet from the worker node including a health status for the worker node and at least a version identifier identifying the workload configuration currently assigned to the worker node;
   the computer system determining that the version identifier received in the data packet is different than a version identifier of a previously received data packet;
   the computer system evaluating the worker node's currently assigned workload configuration, based at least on the received version identifier, to determine whether processing assignment changes are to be made to the workload configuration currently assigned to the worker node;
   the computer system determining that processing assignment changes are to be made to the workload configuration currently assigned to the worker node;
   the computer system determining a set of processing assignment changes to send to the worker node;
   the computer system selecting a subset of the set of determined processing assignment changes to send to the worker node;
   the computer system generating an indication of the selected subset of processing assignment changes to send to the worker node in the form of an assignment packet, the assignment packet being assembled with the selected subset, based on a bandwidth limitation, to avoid exceeding a predetermined maximum transmission unit for a protocol being used to transfer the assignment packet; and
   the computer system sending the assignment packet to the worker node, including an indication for the worker node to update the version identifier, resulting in both the processing assignments currently assigned to the worker node and the version identifier being updated at the worker node.

2. The method of claim 1, wherein the generated assignment packet is sent to the worker node via a fault tolerant communication protocol.

3. The method of claim 2, wherein the fault tolerant communication protocol specifies an upper bound on the number of data packets that are transmitted or received by the computing system per time period.

4. The method of claim 1, wherein the workload changes comprise at least one of adding workloads to the worker node, removing workloads from the worker node, or changing one or more workloads on the worker node.

5. The method of claim 1, further comprising: determining that the bandwidth limitation applies to the indication of workload changes.

6. The method of claim 1, wherein evaluating the worker node's current workload configuration to determine whether workload changes are to be made on the worker node comprises comparing the worker node's currently assigned workload configuration against a master node's indication of which workloads are to be processed by the worker node.

7. The method of claim 6, wherein the generated indication of workload changes to the worker node comprises a delta between the worker node's indication of the currently assigned workload configuration and the master node's indication of which workloads are to be processed by the worker node.

8. The method of claim 1, wherein a bandwidth limit is specified for each protocol that is used to communicate with the computing system or with the worker node.

9. The method of claim 1, wherein the generated indication of workload changes is sent to the worker node as part of a status query message.

10. The method of claim 9, wherein the status query message is sent to the worker node a specified interval, the specified interval corresponding to a priority level for the workload being processed by the worker node.

11. The method of claim 10, wherein the specified interval at which the status query message is sent to the worker node changes dynamically according to the priority level specified for the workload.

12. A computer system comprising the following:
one or more processors;
one or more computer-readable hardware storage devices having stored thereon computer-executable instructions that, when executed by the one or more processors, cause the computing system to perform a method for communicating workload updates between computing nodes in a cluster of nodes, the method comprising:
the computer system identifying a worker node, from the cluster of nodes, that has been assigned to host a workload configuration, the workload configuration comprising processing assignments assigned to the worker node;
the computer system receiving a data packet from the worker node including a health status for the worker node and at least a version identifier identifying the workload configuration currently assigned to the worker node;
the computer system determining that the version identifier received in the data packet is different than a version identifier of a previously received data packet;
the computer system evaluating the worker node's currently assigned workload configuration, based at least on the received version identifier, to determine whether processing assignment changes are to be made to the workload configuration currently assigned to the worker node;
the computer system determining that processing assignment changes are to be made to the workload configuration currently assigned to the worker node;
the computer system determining a set of processing assignment changes to send to the worker node;
the computer system selecting a subset of the set of determined processing assignment changes to send to the worker node;
the computer system generating an indication of the selected subset of processing assignment changes to send to the worker node in the form of an assignment packet, the assignment packet being assembled with the selected subset, based on a bandwidth limitation, to avoid exceeding a predetermined maximum transmission unit for a protocol being used to transfer the assignment packet; and
the computer system sending the assignment packet to the worker node, including an indication for the worker node to update the version identifier, resulting in both the processing assignments currently assigned to the worker node and the version identifier being updated at the worker node.

13. The computer system of claim 12, wherein the generated indication of selected workload changes is sent to the worker node in at least two messages assembled into the assignment packet via a fault tolerant communication protocol, and wherein the fault tolerant communication protocol specifies an upper bound on the number of data packets that are transmitted or received by the computing system per time period.

14. A hardware storage device having stored thereon computer-executable instructions that are executable by one or more processors of a computer system to communicate workload updates between computing nodes in a cluster of nodes, the computer-executable instructions including instructions that are executable to cause the computer system to perform at least the following:
identify, at the computer system, a worker node, from the cluster of nodes, that has been assigned to host a workload configuration, the workload configuration comprising processing assignments assigned to the worker node;
receive, at the computer system, a data packet from the worker node including a health status for the worker node and at least a version identifier identifying the workload configuration currently assigned to the worker node;
determine, at the computer system, that the version identifier received in the data packet is different than a version identifier of a previously received data packet;
evaluate, at the computer system, the worker node's currently assigned workload configuration, based at least on the received version identifier, to determine whether processing assignment changes are to be made to the workload configuration currently assigned to the worker node;
determine, at the computer system, that processing assignment changes are to be made to the workload configuration currently assigned to the worker node;
determine, at the computer system, a set of processing assignment changes to send to the worker node;
select, at the computer system, a subset of the set of determined processing assignment changes to send to the worker node;
generate, at the computer system, an indication of the selected subset of processing assignment changes to send to the worker node in the form of an assignment packet, the assignment packet being assembled with the selected subset, based on a bandwidth limitation, to avoid exceeding a predetermined maximum transmission unit for a protocol being used to transfer the assignment packet; and send the assignment packet to the worker node, including an indication for the worker node to update the version identifier, resulting in both the processing assignments currently assigned to the worker node and the version identifier being updated at the worker node.

\* \* \* \* \*